INVENTOR
CHARLES W. ROSS
BY William G. Miller Jr.
AGENT

May 7, 1968 C. W. ROSS 3,381,946
METHOD AND APPARATUS FOR THE OPTIMIZATION
OF KILN COOLER CONTROL
Filed June 7, 1966 4 Sheets-Sheet 4

United States Patent Office 3,381,946
Patented May 7, 1968

3,381,946
**METHOD AND APPARATUS FOR THE OPTIMIZA-
TION OF KILN COOLER CONTROL**
Charles W. Ross, Hatboro, Pa., assignor to Leeds &
Northrup Company, Philadelphia, Pa., a corporation of Pennsylvania
Filed June 7, 1966, Ser. No. 555,871
20 Claims. (Cl. 263—32)

ABSTRACT OF THE DISCLOSURE

The control system disclosed maximizes the temperature of the secondary air fed to a cement kiln from its grate cooler while maintaining the desired hood draft. That portion of the cooling air exhausted to a stack is controlled to maintain the desired hood draft. The resulting position of the cooling air exhaust stack damper is compared with the position required to maintain the maximum secondary air temperature at a certain grate speed and a certain bed depth on the grate. The difference obtained from this comparison produces a control signal operable to change the grate speed so as to maximize the secondary air temperature.

Figure 1:
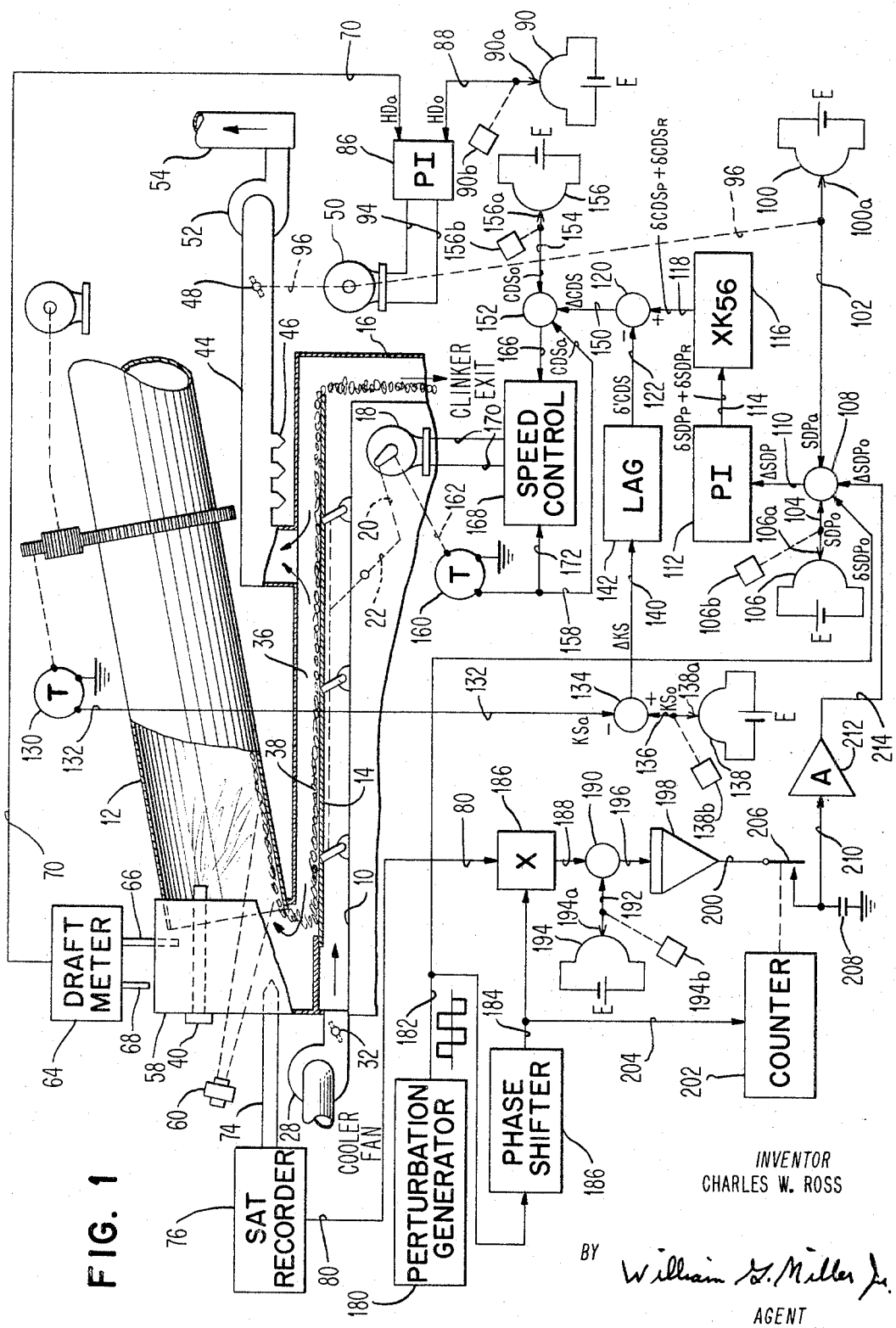

The secondary air temperature is optimized by effecting a perturbation of the grate speed and by utilizing a signal representing the resulting changes in secondary air temperature when multiplied by the perturbation signal, shifted in phase, as a signal which can then be averaged and periodically sampled for use in varying the grate speed control.

---

This invention relates to a method and means for effecting an improved control over the cooler associated with a kiln. More particularly, this invention relates to a method and means for controlling the variables associated with the cooler of a kiln so as to optimize the cooler operation while providing a maximum temperature for the secondary air supplied from the cooler to the kiln.

As the material which is processed in a kiln, such as a rotary cement kiln, leaves the kiln itself, it must be cooled before it can be processed further. This cooling is accomplished by passing cool air through a traveling bed of the product of the kiln. For example, in a rotary cement kiln, the clinker produced is fed onto either a shifting grate mechanism or into another type of conveying mechanism so that the bed of clinker is moved through the length of the cooler in such a way that the cool air introduced into the cooler carries the heat away from the clinker and thus prepares the clinker for further processing.

It is desirable for maximum efficiency in most combustion processes that the primary and/or secondary air temperature be as high as possible. Therefore, the primary and/or secondary air which supports combustion in the kiln is desirably made up of the air which has been utilized to cool the kiln product. In this way the heat derived from the cooling of the kiln products, such as clinker in a cement kiln, is not wasted.

While some coolers are of the rotary type, for the purposes of this description it will be assumed that the cooler is of the type which has a shaking grate which carries a bed of clinker from one end of the cooler to the other by its shaking action. This type of cooler requires that cold air be forced to the underside of the grate and this cold air is then drawn through the grate and through the permeable clinker bed on the grate to the area above the bed from which part is drawn to the rotary kiln itself as secondary air to support combustion in the kiln and the remainder is drawn through a separate exhaust system for the cooler.

In the past, the control of the secondary air temperature has been for maintaining a predetermined value, not a maximum, and this has been accomplished in several ways. One of the more usual approaches has been to keep under control the depth of the clinker bed on the grate in the cooler so that the supply of air permeating the bed picked up a predetermined amount of heat. It was of course necessary at the same time to make sure that the draft in the hood of the kiln was slightly negative so as to prevent danger to the operators of the kiln. For the purposes of of maintaining the desired draft it was necessary to modify in some way the rate at which air was supplied or exhausted from the cooler at the same time that the bed depth on the grate was under control.

In some cases, the pressure of the cold air supplied to the under section of the grate was controlled by controlling the forced draft fan providing that air and in other cases, the exhaust from the upper side of the bed was controlled. However, in most cases, the approach for controlling the bed depth amounted to a control which detected the bed depth as a physical dimension. Those approaches to the control of a kiln cooler have not been as successful as has been desired since the depth of the bed was not always consistent over the full length of the grate and also, depending upon the processing in the kiln, the average porosity or permeability of the bed might be variable even with the same bed depth depending upon the average porosity of the aggregate forming the bed.

It is an object of this invention to provide an improved method and means for controlling the cooler associated with the kiln.

More particularly, it is an object of this invention to provide a control system for maximizing the secondary air temperature fed to a kiln from an associated cooler.

It is still a further object of this invention to provide a control system for optimizing the control of a cooler so as to provide a desired maximum temperature for the secondary air provided to the kiln by the cooler.

In accordance with this invention, there is provided a method and means for controlling the cooler of a kiln which in one physical embodiment comprises a means for controlling the magnitude of that part of the cooling air which is drawn through the exhaust stack associated with the cooler so as to tend to maintain the draft in the hood of the kiln. A second means is then operable in response to the difference between a signal which is related to the magnitude of the exhausted part of the cooling air drawn through the stack and a signal representing that value of the magnitude for the exhausted part of the cooling air which is required to obtain the maximum secondary air temperature at a certain rate of travel for the bed when the bed has a certain resistance to air flow, for producing a signal indicative of the change of the rate of travel required to return the secondary air temperature to its desired maximum value. Further, there is provided a means which is responsive to the change signal, that is the signal indicative of the change in rate of travel of the bed, for modifying that rate of travel to tend to maintain the maximum secondary air temperature.

This control system may be optimized by the addition of the following supplementary elements. First there must be provided a means for supplying two periodic signals having alternate symmetrical half waves of opposite polarity. These signals should have a predetermined phased relationship depending upon the lags of the process itself. In addition, there is required means for applying one of the periodic signals to the cooler control so as to effect a perturbation of a regulated variable of the process. Also there is required a means for producing a signal in response to those changes in the measured variable to be optimized which result from the perturbation of the process. There is then provided a means for multiplying the change in the measured variable resulting from the perturbation by the other of the two periodic signals to thereby produce a product signal. This product signal is then averaged by an averaging means, which may be an integrator and the result of the averaging of the product signal provides a control signal which is periodically sampled at periods which are an integral multiple of the period of the said other of the two periodic signals. The sampled value is stored for one of the periods and applied by another means to the control system of the process to vary the regulated variable in sense and to extent to reduce the control signal substantially to zero.

Figure 2:
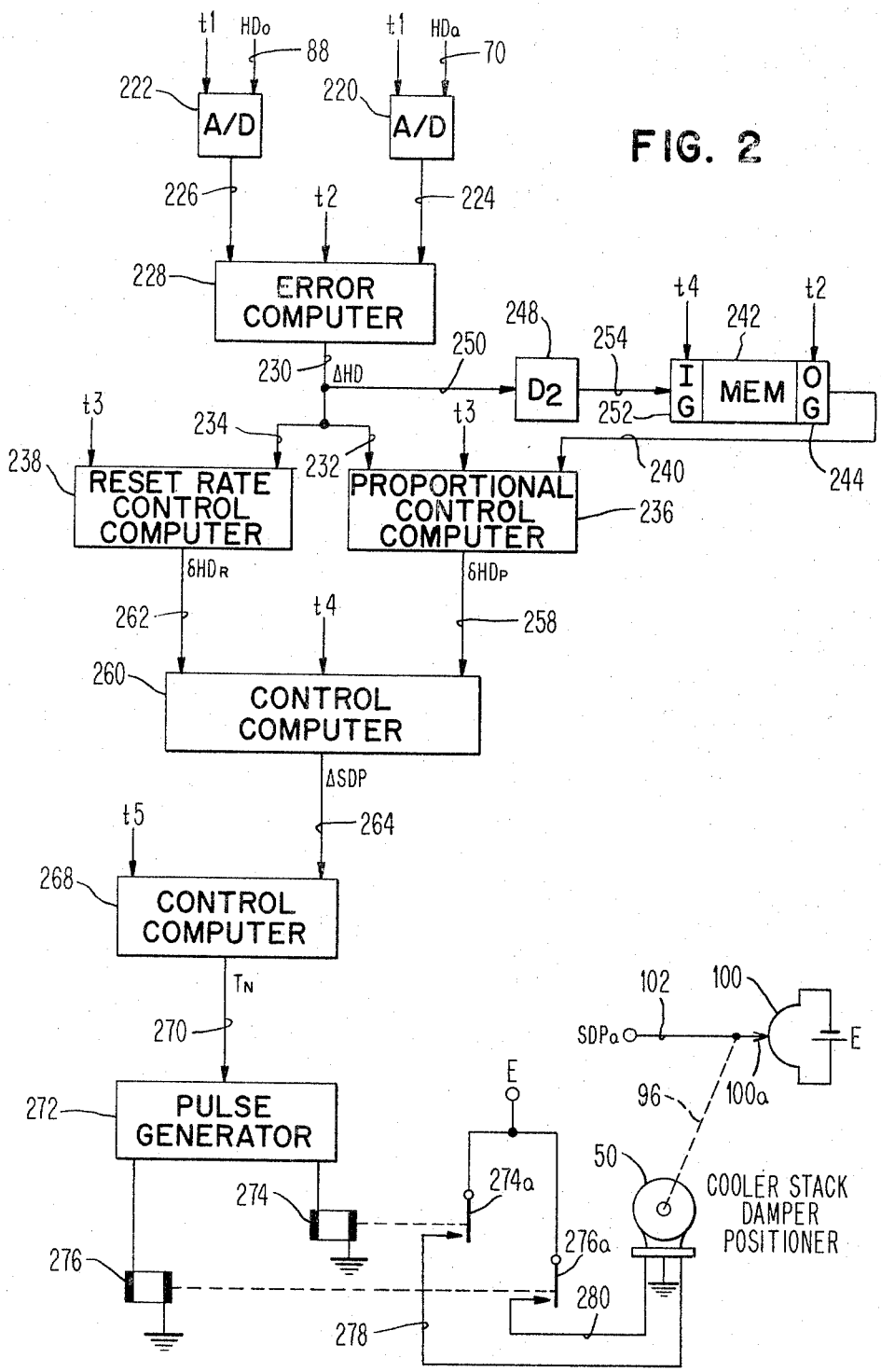
Figure 3:
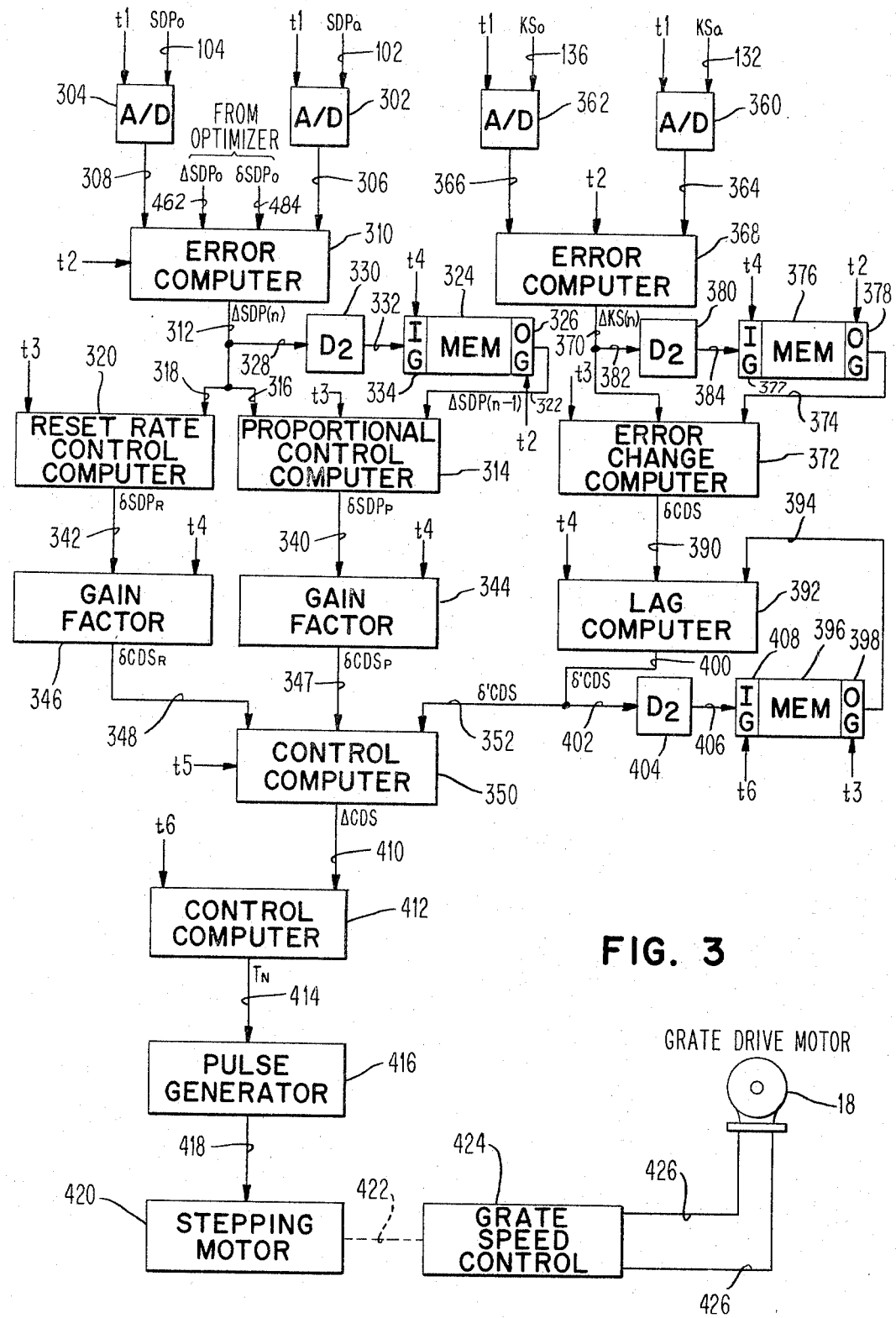
Figure 4:
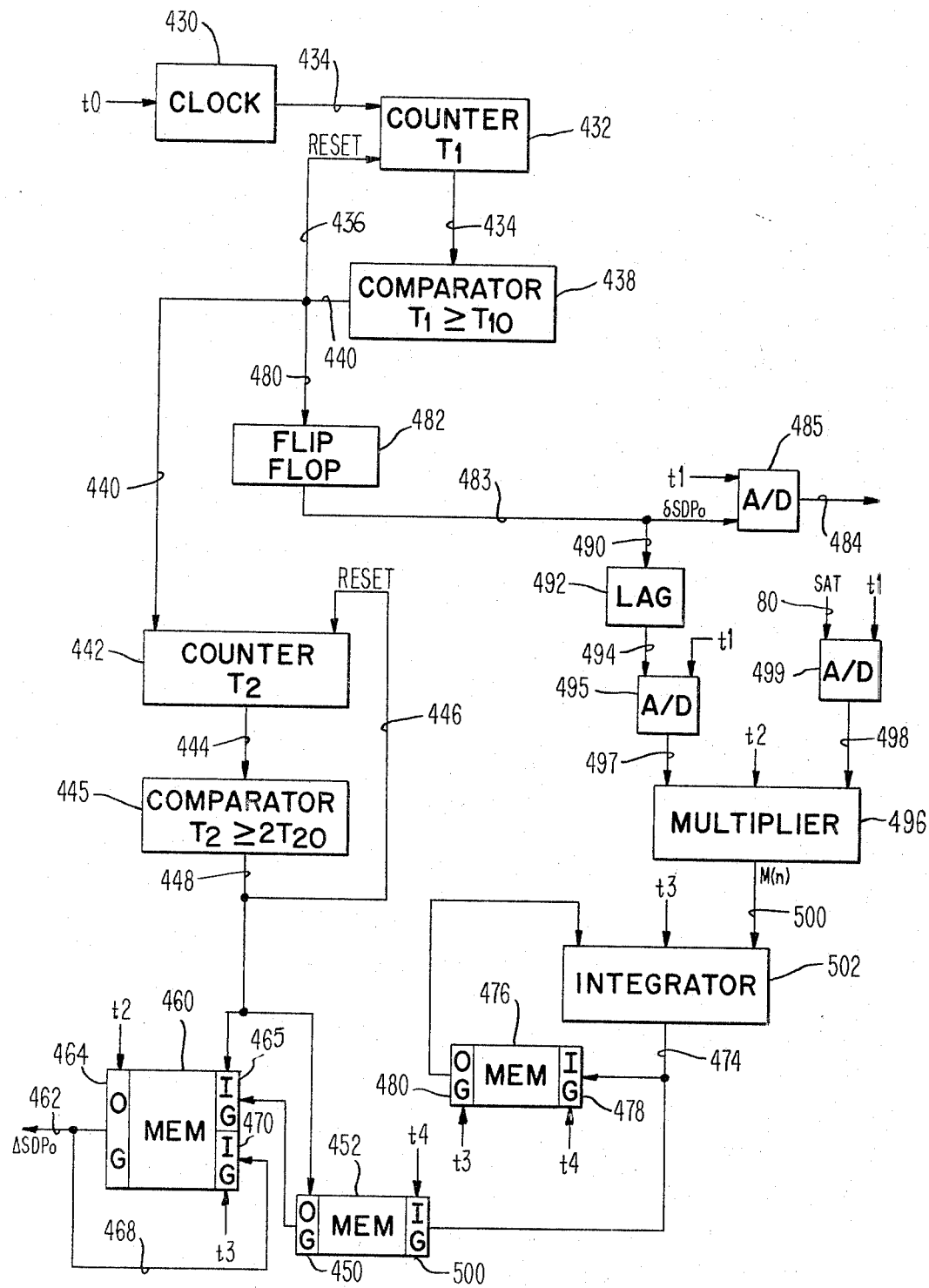

A more detailed understanding of this invention may be had from the following description in conjunction with the drawings in which:

FIG. 1 is a single line block diagram of one form of an analog circuit showing the novel control system as applied to a shifting grate type of cooler for a rotary cement kiln, FIG. 2 is a block diagram of a digital computing and controlling system for effecting the control of the hood draft of a rotary kiln by modifying the damper position in the stack of the cooler exhaust, in a manner analogous to that shown in FIG. 1, FIG. 3 is another block diagram of a digital computing and control system for controlling the grate speed of a cooler such as shown in FIG. 1 by a means analogous to that described in connection with FIG. 1, FIG. 4 is a block diagram of a digital computing and control system which operates in conjunction with the control system of FIG. 3 and which shows the computations and control necessary for the optimization by digital means analogous to the analog means of FIG. 1.

In FIG. 1, the novel control system is shown as being applied to a cooler for a rotary cement kiln. The cooler itself is an elongated chamber 10 which has one end connected to receive clinker from the rotary kiln 12 as it drops down on to the travelling grate 14 to form a bed of clinker on grate 14. As a result of constant shifting the grate 14 tends to feed to the clinker to the right towards the clinker exit 16 from which point the clinker is taken for further processing.

As shown in FIG. 1, the shifting grate 14 is operated by motor 18 which may for example operate to shift the grate 14 by a mechanical linkage including an arm 20 which is eccentrically connected to the shaft of motor 18 and which has its other end connected to one end of a pivoted lever 22. The other end of the pivoted lever is connected directly to the grate 14. The rate at which the grate 14 is shifted may be controlled by the speed of the motor 18, or if desired, the throw of the grate 14 during the shifting operation may be controlled by varying the eccentricity of the connection of linkage 20 with the shaft of motor 18. In some cases, the rate of shift in the grate as well as the throw of the grate are controlled simultaneously to vary the rate of travel of the bed over the grate. For the purpose of simplifying this description, it will be assumed that only the speed at which the grate is shifted will be varied and that its throw will be constant.

As shown, a forced draft fan 28 provides for the introduction of cool air into the region 30 underneath the shifting grate 14. In the particular installation illustrated in FIG. 1, it is assumed that the forced draft or cooler fan is maintained at a constant speed and that the damper 32 in the conduit from the fan to the cooler is maintained at a fixed setting.

The region 36 above the bed of clinker 38 which is carried by the grate 14 is connected to form a passage to the rotary kiln 12 so that some of the air permeating from the region 30 below the grate up through the grate 14 and the bed 38 to the region 36 is carried over into the kiln 12 due to the effect of the induced draft fan associated with the exhaust of the rotary kiln 12. This air supplied from the cooler 10 to the rotary kiln is the secondary air which is utilized to support combustion of the fuel supplied to line 40 to provide for heating the material in the kiln and to carry the heat along the length of the kiln.

That portion of the air in the region 36 above the grate 14 and the bed 38 which is not supplied to the kiln 12 is carried away by a separate exhaust system for the cooler. This exhaust system includes exhausting pipe 44, having dust collecting units 46 and an adjustable butterfly 48 positioned by motor 50 so as to modify the amount of air drawn through the exhaust system by induced draft fan 52. Fan 52 forces the air into the exhaust stack 54.

As shown in FIG. 1, the hood 58 of the rotary kiln has a plurality of apertures in it, such as that through which the radiation pyrometer unit 60 is sighting onto the clinker and also other apertures used for visual observation of the condition in the kiln by the operator. In order to allow for a safe operation of the kiln, it is necessary that the draft in the hood 58 be slightly negative so that there is no expulsion of gases or material through those apertures during the operation of the kiln. For this purpose, there is provided a means for controlling the draft in the kiln at the hood 58. This means includes draft meter 64 which has one pipe 66 connecting to the interior portion of the hood and another pipe 68 which is exposed to the atmospheric pressure exterior to the hood. The draft meter 64 may be any one of a number of well known and easily available draft meters which are capable of measuring the draft and of producing on an output line such as line 70 a signal indicative of the draft measured.

While it is desirable to maintain a predetermined negative draft in the hood 58, it is also desirable that the temperature of the secondary air which is supplied from the region 36 above the bed 38 should be maintained at a maximum temperature or as close as possible to a maximum temperature as is compatible with the operation of the process itself. This particular maximum temperature will be known as the desired maximum temperature and while it may not always be the maximum obtainable temperature for the secondary air it will be essentially that maximum temperature which can be efficiently obtained without jeopardizing the stability of the control of the process.

In order to measure the temperature of the secondary air there is provided a thermocouple 74 which is connected to the secondary air temperature recorder 76 which recorder measures the secondary air temperature as it enters the kiln 12 and provides on its output line 80 a signal indicative of the secondary air temperature.

There will now be described the method and means by which the draft in the hood 58 is maintained at the desired value while the secondary air temperature is maintained at its desired maximum.

In the control of the draft in the hood 58, the signal on line 70 is utilized as an indication of the measured draft. This signal is identified as $HD_a$ and is provided as one input to controller 86 which is any one of a number of standard type controllers having both proportional and integral action as indicated by the PI indication in block 86. The other input to the controller 86 is by way of line 88 from the variable contact 90a on slidewire 90 as adjusted by the knob 90b so as to obtain on line 88 a signal $HD_0$ which represents the setpoint for the hood draft, or in other words, the desired value for the draft in hood 58. The potentiometer slidewire 90 is supplied by a potential E so as to provide the desired signal on line 88.

The output of the controller 86 is supplied on the lines 94 to motor 50 and the signals supplied on lines 94 to motor 50 are effective to position the butterfly valve 48 by way of the connecting shaft 96. The output signal of the controller 86 will be such as to cause a continuous positioning of the damper or butterfly valve 48 until the desired hood draft is established.

It has been found that the position of the butterfly valve 48 is an indication of the average permeability of the bed 38 on grate 14 and therefore this position can be utilized as a substitute for a measurement of bed depth and is, in fact, a more accurate indication of the effective bed depth or porosity than could be made by any of the known means for measuring the bed depth. Therefore, as shown in FIG. 1, an extension of the shaft 96 is effective to position the variable contact 100a on potentiometer slidewire 100 so as to vary the signal on line 102. As shown, the slidewire 100 is supplied by a potential source E.

The signal supplied on line 102 by the position of the contact 100a may be represented as signal $SDP_a$, representing the actual stack damper position, the stack damper being the butterfly valve 48.

A preset desired stack damper position is represented by the signal on line 104, namely $SDP_0$. This signal is obtained by adjusting the movable contact 106a on slidewire 106 by adjusting knob 106b. As shown in FIG. 1, the slidewire 106 is supplied by potential source E.

The signals $SDP_a$ and $SDP_0$ may then be compared at the summing junction 108 and the difference would provide a signal on line 110 $\Delta SDP$ indicative of the deviation of the actual stack damper position from the desired stack damper position. For the present description it will be assumed that the only signals supplied to the summing junction 108 are those supplied on lines 102 and 104. The remaining signals shown in FIG. 1 as being supplied to that summing junction will be explained subsequently.

The signal $\Delta SDP$ which appears on line 110 provides an input to controller 112 which provides both proportional and integral control as indicated by the PI indication in block 112. There is then provided on the output line 114 from controller 112 a signal which represents the quantity $$(\delta SDP_P + \delta SDP_R)$$

whose terms respectively represent the proportional and integral control components of the signal. The signal on line 114 is introduced into a multiplier 116 which multiplies the signal by a constant $K_{56}$ to provide on the output line of the multiplier 118 a signal which represents $$\delta CDS_P + \delta CDS_R$$

The multiplier 116 effectively converts the control terms representative of the stack damper position into terms representative of the cooler drive speed, or in other words, the speed of the grate drive motor 18. Thus, the signal on line 118 is indicative of the desired proportional and reset control action for the control of the grate speed.

The signal on line 118 is introduced into summing junction 120 which also receives as another input signal a signal from line 122 which is representative of $\delta'CDS$. The signal on line 122 is a feed forward signal from the kiln speed which is utilized to anticipate the changes in the grate speed which will be required due to changes in the kiln speed itself. As the kiln speed changes, the rate of feed of clinker onto the grate 14 changes and in order to maintain a desired bed depth, it is necessary to change the grate speed to compensate for the kiln speed changes.

The anticipating signal supplied on line 122 is obtained by measuring the kiln speed by means of tachometer 130 which is driven from the kiln drive motor. One of the output terminals of tachometer 130 is connected to ground while the other terminal is connected to line 132 to supply a signal $KS_a$ to summing junction 134. This signal represents the actual kiln speed.

Another signal supplied to summing junction 134 on line 136 is a signal $KS_0$ representing the setpoint for the kiln speed. This setpoint signal is derived from the movable contact 138a of potentiometer slidewire 138 as adjusted by the knob 138b. The potentiometer slidewire 138 is supplied as shown in FIG. 1 by a potential source E.

The difference between the signal $KS_a$ and the signal $KS_0$, determined by the summing junction 134, provides an output from the summing junction on line 140, namely a signal $\Delta KS$ representative of the change in kiln speed from the desired or setpoint value. That signal is supplied as an input to a lagging circuit 142 which in turn provides its output on line 122 as the signal $\delta'CDS$. The lagging circuit 142 may be any one of a number of circuits as necessary to provide the desired first order lag effect in the signal from line 140. The magnitude of the lag effect is, of course, related to the time between a change in kiln speed and the resulting change in bed depth on the cooler grate and should include the relationship between kiln speed and the desired change in cooler grate drive speed.

It will thus be seen that the summing junction 120 provides for a combination of the signal on line 118 with that on line 122, these signals being generally of opposite polarity, the resulting signal being the signal $\Delta CDS$ on line 150. The signal on line 150 is then supplied as one of the inputs to the summing junction 152. It represents the change in the cooler drive speed, or in other words, the change in the speed of the grate 14, required in order to maintain the maximum secondary air temperature.

The preset desired cooler drive speed or grate speed is represented by a signal $CDS_0$ on line 154 which is supplied from the variable tap 156a of potentiometer slidewire 156 as adjusted by the knob 156b. The potentiometer slidewire 156 is supplied as shown in FIG. 1 by a potential source E. The signal $CDS_0$ on line 154 is one input to a summing junction 152. Another input to the summing junction 152 is supplied on line 158 and is a signal $CDS_a$ representing the actual drive speed of the grate, or in other words, the speed of the motor 18. This signal is established by the output of tachometer 160 which has one terminal connected to ground and the other terminal connected to line 158. The tachometer 160 is driven by the shaft 162 connecting it to the shaft of motor 18.

The output of the summing junction 152 on line 166 is a signal representing the deviation of the actual cooler drive speed or grate speed, or in other words, the change in the speed of the cooler grate from that desired speed represented by the sum of the signals on lines 150 and 154, namely $\Delta CDS$ and $CDS_0$.

The signal on line 166 provides an input signal to speed control 168. This speed control circuit may be any one of a number of well known circuits for controlling the speed of a motor from a control signal. The speed control 168 provides on output lines 170 the necessary power for driving the motor 18 at the desired speed. The speed control 168 may require a feedback circuit, such as that shown by line 172 which is connected to line 168 and derives a potential from tachometer 160 indicative of the actual speed of motor 18.

It has been found that the control system just described may be initially adjusted by setting the signal $CDS_0$ and the signal $SDP_0$, by adjusting knobs 156b and 106b respectively, so that with a certain depth of bed 38 on grate 14 and with a particular position of butterfly valve 48 to obtain the desired hood draft the desired maximum secondary air temperature is obtained. It will be evident to those familiar with the operation of coolers of the type shown in FIG. 1 that for a particular setting of the butterfly valve 48 as is necessary to maintain the desired draft in the hood 58, there will be a particular average permeability for the bed 38 which will give the desired maximum temperature for the secondary air supplied from the region 36 above the bed to the kiln 12.

The permeability of the bed 38 will depend to a great extent upon the rate at which the bed travels along the length of the cooler and this will be determined by the rate at which the grate is driven. If the grate is driven at a slow rate, the permeability of the bed will be low and the air which is filtered through the bed 38 will be raised to a higher temperature than would be reached if the bed were driven at a fast rate. As the bed depth increases the permeability of the bed decreases and the air supplied to the region 30 below the grate apparently tends to seek other paths to the upper regions of the grate and will at a certain point start to flow through such leakage paths rather than through the bed 38 itself. When the air does tend to flow through the leakage paths instead of through the bed, naturally the temperature of the air in the region 36 above the bed will decrease so that the characteristic curve of the secondary air temperature vs. the position of the butterfly valve 48, the permeability of the bed 38, will be generally one which shows an increasing secondary air temperature as the butterfly valve 48 is closed. However, the secondary air temperature will reach a peak at a particular position of the butterfly valve 48 and after that point as the valve 48 is closed further, the secondary air temperature will fall off rapidly for the air supplied to the region below the grate will be following the leakage paths around the bed 38 to a great extent rather than going through the bed 38. It will be evident to those familiar with the control art that it is desirable to control the secondary air temperature at the maximum value and therefore at the peak of the characteristic above mentioned. However, it is also necessary to make sure that the control does not allow the stack damper or butterfly valve 48 to fully close under normal control action. To accomplish this, it is desirable to work only on one side of the peak, namely on that side which allows adequate control range for the butterfly valve to maintain hood draft. In order to prevent the control being such that the damper 48 takes an undesirable position, the control may utilize a peak seeking type of control system which is biased so as to maintain the control on the safe side of the peak. In other words, the butterfly valve 48 must not be maintained at a position which will allow it to be positioned to a limit under normal control action.

There will now be described the type of peak seeking control which is desirable for the modification of the grate speed control system described above so as to allow for the optimization of the control effected by the control system under varying process conditions. Reference may be had to U.S. patent application Ser. No. 192,173 for a theoretical discussion which will aid in the understanding of this system.

For the purpose of providing the peak seeking control, there is supplied in FIG. 1 a perturbation generator 180 which is shown as supplying on the output line 182 a symmetrical A.C. signal which could be a sine wave for example. Preferably, this signal is a square wave whose alternate half cycles are of opposite polarity as shown. This square wave signal is denoted as the signal $\delta SDP_0$ and is one input to summing junction 108 and may be considered as the perturbing signal which will be effective through the controller 112 and the other elements of the control system affecting the speed of the drive of the grate to thereby affect a perturbation of the regulated variable for the process, namely the grate speed. Thus, the signal on line 182 is one of two periodic signals. The other periodic signal is supplied on line 184 which is connected on line 182 by way of phase shifter 186. The phase shifter 186 may be any one of a number of phase shifting circuits as necessary to shift the phase of the signal on line 182 as may be determined to be necessary in accordance with the lag in the process itself. The signal on line 184 is supplied as one of the inputs to multiplier 186. The other input to the multiplier 186 is supplied on line 80 from the secondary air temperature recorder 76. Since the signal on line 80 is a varying D.C. signal, it is advantageous to add zero suppression of the signal. Such an effect may be incorporated in the recorder 76. The product of the signal supplied on line 184 and that supplied on line 80 provides an output signal on line 188 to summing junction 190. It will be evident that the signal on line 188 will be a positive signal on one side of the peak of the characteristic curve of the process previously described and will be negative on the other side of the peak, so that in order to optimize the control by operating at the peak, it is only necessary that the process be controlled so that the average signal on line 188 is equal to the value of the signal on line 192.

As previously mentioned, it is desired to operate at one side of the peak in order to guarantee that the control will not go over the peak and therefore it is necessary to introduce a bias so as to cause the control to operate on a particular slope of the characteristic curve. This bias is introduced on line 192 from a variable tap 194a of potentiometer slidewire 194 as determined by the setting of knob 194b. The slidewire 194 is supplied by a potential source E.

The sum of the signal supplied on line 188 and that supplied on line 192 as effected by the summing junction 190 provides an output on line 196 to integrating amplifier 198. The integrating amplifier 198 serves to average the signals on line 196 so as to produce an average signal on line 200.

In order to prevent the circulation in the process control loop of extraneous perturbations, it is desirable that the signal on line 200 be sampled periodically over an integral number of cycles of the signal on line 182 and that the periodically sampled value be utilized to effect the control necessary to tend to reduce the periodic component of the signal on line 200 to zero. The D.C. component of the signal on line 200 will be effective to cause the system to operate on the average at that desired position near the peak of the characteristic as determined by the bias adjustments established on line 192.

For the purpose of sampling the signal on line 200, there is provided a signal from line 184 to counter 202 by way of line 204. The counter 202 counts an integral number of cycles of the signal on line 184 and after that integral number of cycles it closes the contacts 206 of a relay so as to cause the signal on line 200 to charge up capacitor 208 to a corresponding value. The contacts 206 are then disengaged by deenergizing the relay and the signal which appeared on line 200 is held on capacitor 208. That signal is then supplied as an input on line 210 to operational amplifier 212 so as to provide as an output signal from the operational amplifier a signal $\Delta SDP_0$ on line 214. The signal $\Delta SDP_0$ is indicative of the change in the setpoint for the stack damper position established by the signal on line 104 necessary for operating in the optimum condition.

By way of summary, it will be seen that the perturbation generator 180 introduces by way of line 182 a signal which causes a perturbation of the grate drive speed. This perturbation of the grate drive speed will in turn cause a periodic variation in the secondary air temperature as recorded by recorder 76 as a result of the perturbation. That periodic disturbance in the secondary air temperature will be fed by line 80 to the multiplier 186 where it will be multiplied by a signal from line 184 having a similar frequency and shifted by phase shifter 186 so as to take into account the lag between the production of the perturbation and the response detected by the recorder 76. The multiplication of the signals on line 184 and line 80 provide a signal on line 188 whose sign indicates on which side of the peak of the characteristic curve the process is operating. There is then introduced a bias to maintain the process on one side of the peak and the biased product signal is averaged by an integrator which provides a signal which is periodically sampled and which is utilized to effect a control action to tend to correct the grate drive speed so that the perturbations will cause no change in the secondary air temperature, or in other words, so that the grate drive speed will be such that the system will be operating at the desired point on the characteristic curve.

It will be evident to those skilled in the art that the control system of FIG. 1 may be carried out by the use of digital computation and control arrangements. One such arrangement is shown in FIGS. 2, 3 and 4 which, taken together, are designed to provide a control operation which is similar to that shown in analog form in FIG. 1.

In FIG. 2, the digital system for providing the control of the draft in the hood 58 is shown. In FIG. 2, the signals HD$_a$ and HD$_0$ are respectively supplied on lines 70 and 88 which correspond with the similarly numbered lines in FIG. 1. These signals are converted from analog form to digital form at a time $t_1$ by the analog-to-digital converters 220 and 222, both of which provide the corresponding digital output signals on the respective lines 224 and 226 at the end of a predetermined period which is begun at the time $t_1$. At the end of the period begun at the time $t_1$ the time period which begins at the time $t_2$ starts and at that time the error computer 228 which receives the signals from lines 224 and 226 as input signals provides a computation in accordance with the following equation:

$$HD_0 - HD_a = \Delta HD$$

to give a signal representing the draft error. There is then produced on the output line 230 the signal $\Delta HD$ at the end of the period $t_2$. This signal then provides input by way of lines 232 and 234 to the proportional control computer 236 and the reset-rate control computer 238 respectively. The computation provided by the proportional control computer 236 is in accordance with the following equation:

$$\Delta HD(n) - \Delta HD(n-1) = \delta HD_P$$

to determine the desired proportional control action, while the computation provided by the reset rate control computer 238 is in accordance with the following equation:

$$K_1 \Delta HD = \delta HD_R$$

to determine the desired reset control action. The computations by the computers 236 and 238 are carried out at the time $t_3$ in response to the timing signals introduced as inputs to these computers. Similarly all other computations and control actions are carried out at the time indicated by the timing signal associated with the block representing that function. One of the inputs to the proportional control computer 236 is supplied by way of line 240 from the memory 242 at the time $t_2$ by virtue of the timing signal $t_2$ being introduced to output gate 244 to read out the memory 242. The memory 242 is loaded with the signal $\Delta HD$ after a delay of two time periods. This delay is introduced by the delay device 248 which is connected by way of line 250 to line 230. The delay device is then connected to the input gate 252 by way of line 254 and the signal $\Delta HD$ is gated into the memory 242 at the time $t_4$ following the appearance of that signal on line 230 at the time $t_2$ in the previous time cycle of the computer. The output on line 232 is thus the signal $\Delta HD$ during the $n$th cycle of the computer while the signal on line 240 is the same signal from the previous cycle, namely the $(n-1)$ cycle.

The proportional control computer 236 produces on it output line 258 a signal $\delta HD_P$ which is one of the input signals to control computer 260. The other input to control computer 260 is the signal $\delta HD_R$ which is supplied on line 262 as an output from the reset rate control computer 238 in which the reset rate $K_1$ is multiplied by $\Delta HD$. The control computer 260 then makes a computation at time $t_4$ in accordance with the following equation.

$$K_1[\delta HD_P + \delta HD_R] = \Delta SDP$$

to determine the total control action to be taken in positioning the valve 48.

At the end of the time period $t_4$, the output signal from the control computer 260 appears on line 264 as signal $\Delta SDP$, which is an input to the control computer 268 which then makes a computation in accordance with the following equation $$K_3(\Delta SDP) = T_N$$

to establish an output signal $T_N$ on line 270 at the end of the time period $t_5$ when that computation is made. The output signal $T_N$ on line 270 represents the required duration for the pulse to be generated by pulse generator 272.

The pulse generator 272 supplies a pulse signal to the "close" relay 274 or to the "open" relay 276 depending upon the polarity of the signal on line 270. The duration of the pulse signal depends upon the magnitude of signal $T_N$. The effect of a signal to the "close" relay 274 is to pull in the relay contact 274a to complete the circuit between the potential source E and line 278 and thus to provide current to the winding of the motor 50 which tends to close the stack damper or butterfly valve 48 (FIG. 1).

The shaft 96 of the motor 50 will cause a positioning of the variable tap 100a which produces the signal SDP$_a$ on line 102 is similar fashion as shown in FIG. 1 for the comparably numbered elements.

Upon energization of the "open" relay 276 the relay contacts 276$_a$ are closed to complete the circuit between the potential source E and the line 280 which provides current to the terminal of motor 50 connected with the winding which causes the motor 50 to rotate so as to tend to open the stack damper or butterfly valve 48.

From the above description it would be seen that the digital control circuit of FIG. 2 operates in a similar fashion to the draft control system shown in FIG. 1 and provides both proportional and integral or rest action similar to that provided by the controller 86 of FIG. 1.

In FIG. 3 there is shown a digital computing and control circuit which is effective to modify the speed of the grate drive motor in accordance with a control arrangement which is similar to that shown and described with reference to FIG. 1.

In FIG. 3 the signals SDP$_a$ and SDP$_0$ are supplied respectively on lines 102 and 104 which correspond to the similarly numbered lines of FIG. 1. The analog signals provided on these lines are converted to digital signals by the analog-digital converters 302 and 304 respectively. This conversion is carried out in time period $t_1$ to produce on lines 306 and 308 respectively input signals to error computer 310. The error computer 310 also receives as input signals the signal $\Delta SDP_0$ and $\delta SDP_0$ on lines 462 and 484 respectively which lines correspond with similarly numbered lines in FIG. 4 which shows the optimizing circuit to be explained.

The error computer 310 makes a computation at $t_2$ in accordance with the following equation:

$$SDP_0 - SDP_a + \Delta SDP_0 + SDP_0 = \Delta SDP$$

to determine the deviation of valve 48 from its setpoint as modified by the perturbations applied to the process and the control error determined by examining the response of the process to those perturbations. The output signal from the error computer 310 on line 312 is a signal $\Delta SDP(n)$ which represents that signal in the $n$th cycle of the computer. This signal is utilized as an input to the proportional control computer 314 and is supplied to that computer by way of line 316. The signal on line 312 is also provided by an input by way of line 318 to the reset rate control computer 320. The proportional control computer 314 has another input on line 322 which is provided from memory 324 by way of the output gates 326 at the time $t_2$ so that the signal on line 322 which is $\Delta SDP(n-1)$ represents the signal on line 312 which was present during the previous computation, that is during the previous cycle of the computer. It will be seen that the signal $\Delta SDP$ which is stored in the memory 324 is introduced by way of line 328 and a two period delay circuit 330 which connects by way of line 332 to the input gate 334 of memory 324. The input gate 334 is activated at the time $t_4$ following the time period $t_2$ when the error computer 310 makes its computation.

The proportional control computer 314 makes its computation in accordance with the following equation:

$$\Delta SDP(n) - \Delta SDP(n-1) = \delta SDP_P$$

which gives the desired proportional response. This computation is made in the time period $t_3$.

The reset rate control computer 320 makes a computation in accordance with the following equation:

$$K_{58} \cdot \Delta SDP(n) = \delta SDP_R$$

which gives the reset action desired. This computation is also made during the time period $t_3$. As a result of the computations of the computers 314 and 320, there is provided on their respective output lines 340 and 342 signals which provide inputs to respective gain factor computers 344 and 346. The gain factor computers operate to make their calculations at the time $t_4$ as indicated by the introduction of the timing signal $t_4$ into those computers. The gain factor computation for the computer 344 is in accordance with the following equation:

$$K_{56} \cdot \delta SDP_P = \delta CDS_P$$

to convert the proportional response computed into terms of cooler or grate drive speed and proportional gain. While the gain factor computation made by the computer 346 is in accordance with the following equation:

$$K_{56} \cdot \delta SDP_R = \delta CDS_R$$

to convert the reset response. There is thus produced on the output line 347 a signal $\delta CDS_P$ while the signal produced on line 348 is the signal $\delta CDS_R$. These signals respectively represent the proportional and the reset control terms of grate speed or cooler drive speed as it may be termed. These terms were obtained by the conversion of the signals $\delta SDP_P$ on line 340 and $\delta SDP_R$ on line 342 by the multiplication of those signals by the respective gain factors which in this case are equal, namely the gain factor $K_{56}$. The lines 346 and 348 are input lines to the control computer 350. Another input line to the control computer 350 is line 352 which provides the signal $\delta'CDS$ whose derivation will now be explained.

As previously mentioned, it is desirable to supply in the control system for the grate drive a feed forward signal from the kiln speed in order to anticipate changes in the permeability of the bed 38 in the cooler which will result from changes in the rate of feed of clinker to the bed from the kiln when the kiln speed changes in response to other control systems. The kiln speed may be changed, for example, in response to control systems which are effective to control the temperature of the clinker in the kiln 12 or the kiln speed may also be changed to maximize the output of the kiln.

The signal $KS_a$ and $KS_0$ representing the actual and desired kiln speed are obtained from lines 132 and 136 respectively. These lines correspond with similarly numbered lines in FIG. 1. The analog signals supplied on lines 132 and 136 are converted by the analog-to-digital converters 360 and 362 respectively. This conversion is carried out in the time period $t_1$ as indicated by the timing signal $t_1$ introduced into the analog-to-digital converters 360 and 362. As a result there is provided on lines 364 and 366 respectively the signals $KS_a$ and $KS_0$ in digital form as inputs to the error computer 368. The error computer 368 calculates the following equation:

$$KS_0 - KS_a = \Delta KS$$

to determine the kiln speed error. This computation is carried out in the time period $t_2$ in response to the input to the error computer 368 of a timing signal $t_2$ so as to supply on an output line 370 the signal $\Delta KS(n)$. This output signal is then supplied as an input to error change computer 372. The other input to the error change computer 372 is by way of line 374 from the memory 376 through the output gates 378 which are operated at the time $t_2$. The input to the memory 376 is provided by way of the input gates 377 which are operated at the time $t_4$. The signal on line 370 is supplied to the input gates by way of a two period time delay circuit 380 which is connected to line 370 by way of line 382 and which is also connected to the input gates by way of line 384.

The error change computer 372 calculates at the time $t_3$ the following computation:

$$K_1[\Delta KS(n) - \Delta KS(n-1)] = \delta CDS$$

which gives the change in kiln speed error since the last cycle of computation and takes into account the conversion to term related to cooler drive speed by using the constant $K_1$.

As a result, there is produced on the output line 390 from the computer 372 a signal $\delta CDS(n)$ which is introduced as an input into the lag computer 392. The lag computer 392 computes at the time $t_4$ the following computation:

$$(1-\alpha)\delta'CDS(n-1) + \alpha \cdot \delta CDS = \delta'CDS$$

which includes the constant $\alpha$ to determine the effective time constant of the lag. As will be evident, the lag computer 392 utilizes as another input the signal on line 394 which is derived from the memory 396 by way of the output gates 398 which are operated at the time $t_3$. The signal supplied to the memory 396 is derived from the output line 400 of the lag computer 392 and is a signal representative of $\delta'CDS$. This signal is connected by way of line 402 to a two period delay 404 which is in turn connected by line 406 to the input gates 408 to a memory 396. The signal on line 406 is gated into the memory 396 at the time $t_6$. There is thus provided on line 394 the term $\delta'CDS(n-1)$ while the signal supplied on the line 390 is $\delta CDS(n)$. Thus the computation in the lag computer 392 effectively provides a signal on the output line 400 which is derived from the input signals on lines 390 and 394 but which is representative of the signal on line 390 after the introduction of a first order lag.

The control computer 350 makes a computation in accordance with the following equation:

$$\delta CDS_P + \delta CDS_R + \delta'CDS = \Delta CDS$$

to combine the feed forward signal with the total control response desired. This computation is made during the time period $t_5$. There is thus produced on the output line 410 the signal $\Delta CDS$ which is an input signal to control computer 412. The control computer 412 makes a computation in accordance with the following equation in the time period $t_6$:

$$K_P(\Delta CDS) = T_N$$

The output of the control computer 412 is then a signal $T_N$ which is provided on line 414 and which is a timing signal whose magnitude is indicative of the number of the pulses desired from pulse generator 416 to effect the desired control action. This timing signal $T_N$ is thus supplied as an input to the pulse generator 416 which then provides a series of pulses on line 418 to stepping motor 420 whose shaft 422 is operative to provide an input to a grate speed control 424, such that there is supplied on lines 426 a signal for determining the speed of the grate drive motor 18.

It will be evident that the control system as described above for FIG. 3 is effective to provide a control arrangement similar to that shown for the control of the grate drive in FIG. 1.

The peak seeking control which is utilized in FIG. 1 to optimize the control process is capable of execution in a digital fashion. A digital system for accomplishing this type of control in cooperation with the digital system of FIG. 2 and FIG. 3 is shown in FIG. 4.

In FIG. 4 the clock 430 provides clock pulses on line 434 to counter 432. These clock pulses are generated in synchronism with the timing pulses which time the execution of the various computations by synchronization from one such signal $t_0$ which may be from a master clock for the whole computer. The output of the counter 432 on line 434 represents the count of the pulses provided by the clock until the counter is reset by a signal on line 436. The counter will be reset by a signal on line 436 whenever the comparator 438 determines that the count appearing on line 434, namely $T_1$, is greater than or equal to a count $T_{10}$ which represents a predetermined time duration. When that situation exists, there is an output provided on line 440 which is connected to line 436 to reset counter 432.

The output on line 440 is a pulse which is introduced as an input into counter 442. The counter 442 then counts the pulses from line 440 and provides the count on its output line 444 until the counter is reset by a signal on line 446. The resetting signal on line 446 is supplied whenever the signal on line 444, namely the count of counter 442, represented as $T_2$, is greater than or equal to $2 \times T_{20}$ as determined by comparator 445, twice the time duration $T_{20}$, which is a predetermined duration. At the time that $T_2$ is greater than or equal to $2 \times T_{20}$ there is a pulse produced on the output line 448 from comparator 445. Line 448 is connected to the reset line 446 which is effective to provide a reset signal to the counter 442. Line 448 is also connected to provide a signal to the output gate 450 of memory 452. The appearance of a signal on line 448 is effective through the operation of output gate 450 to transfer information out of memory 452 into memory 460 by way of input gate 465.

The signal on line 440 is connected also to line 480 which provides an input to flip-flop 482. This flip-flop provides either a plus or minus output signal on line 483, which is a single line symbolically reresenting the usual two output lines from the flip-flop. The signal on line 483 will thus be considered to be either positive or negative depending upon the condition of the flip-flop 482. The signal on line 483 is representative of $\delta SDP_0$ and is connected to the analog-to-digital converter 485. The digital signal which is provided as an output from analog-to-digital converter 485 is supplied by way of line 484 to the error computer 310 of FIG. 3. The signal $\delta'SDP_0$ on line 483 is also supplied by way of line 490 to a lag circuit 492 which has as its output a signal on line 494 which in turn provides a signal to the analog-to-digital converter 495 and thence to multiplier 496 by way of line 497. The converters 485 and 495 are both timed to operate at time $t_1$.

The other input of the multiplier 496 is by way of line 498 from the analog-to-digital converter 499 which receives its input from line 80 which carries a signal representative of the secondary air temperature and which corresponds to line 80 in FIG. 1. As mentioned in connection with FIG. 1, the signal on line 80 can advantageously be subjected to zero suppression. The conversion from analog signals on line 80 to the digital signal on line 498 is provided at the time $t_1$ by way of the introduction of the timing signal $t_1$ to the analog-to-digital converter 499. The multiplier 496 utilizes the input from line 497 and 498 to make a computation in accordance with the following equation:

$$(SAT) \times (\delta SDP_0) + K_S = M$$

which is comparable to the multiplication of multiplier 186 of FIG. 1. As a result of this computation, the output on line 500 is a signal $M(n)$ which is the input signal to the integrator 502. The integrator 502, which is comparable to integrator 198 of FIG. 1, serves to make a computation in accordance with the following equation:

$$\int M(n-1) + M(n) = \int M$$

which sums the signals produced in previous computations of multiplier 496, including the $(n-1)$ cycle of the computer, with the computation produced during the present $(n)$ cycle. This summation is the equivalent of an integration and therefore the output produced on line 474 is the integral of M. The signal on line 474 is gated into memory 476 by way of input gate 478 at time $t_4$ and is then gated out by output gate 480 at time $t_3$ of the next cycle of the computer system to provide the quantity $\int M(n-1)$.

The signal on line 474 is stored into memory 452 by gating the signal in through input gate 500 at time $t_4$. This reading into memory must be a destructive read-in for the contents of memory 452 are read out much less frequently than the signals on line 474 are read in. As mentioned, a signal is produced by comparator 445 on line 448 to indicate a count from counter 442 equal to or greater than the duration $2 \times T_{20}$. The signal on line 448 actuates output gate 450 to gate the contents of memory 452 into memory 460 by way of input gate 465 activated by the signal on line 448, also. The value of the signal derived from the integrator 502 is now held in memory 460 to be read out to output line 462 at time $t_1$ by output gate 464. At the same time the signal gated out, namely $\Delta SDP_0$ is recirculated into memory 460 by way of line 468 and input gate 470 at time $t_3$. Line 462 connects to computer 310 as shown in FIG. 3.

It will be evident from the above description that the digital computing arrangement of FIG. 4 is capable of providing the peak seeking type of control which is described above in connection with FIG. 1 in a manner analogous to that provided by FIG. 1.

While the digital computing and control system shown described in FIGS. 2, 3 and 4 is one arrangement which can be used to provide a control system similar to that of FIG. 1, it will be evident to those skilled in the digital computer art that the computations provided by the systems of FIGS. 2, 3 and 4 can be provided also by a general purpose digital computer programmed to make the calculations described.

What is claimed is:

1. A control system for controlling the clinker cooler of a rotary kiln to maximize the secondary air temperature while maintaining the desired hood draft when part of the air filtered through the traveling clinker bed of the cooler is used as secondary air for supporting combustion of the fuel in the kiln and part is drawn through a cooler exhaust stack, comprising a first means for controlling the magnitude of that part of the cooling air drawn through the exhaust stack so as to tend to maintain said draft, a second means operable in response to the difference between a signal related to the magnitude of said exhausted part and a signal representing that value of said magnitude required to obtain said maximum secondary air temperature at a certain rate of travel for said clinker bed when said bed has a certain resistance to air flow for producing a signal indicative of the change in said rate of travel required to return the secondary air temperature to its desired maximum, and a third means responsive to said change signal for modifying said rate of travel in accordance with said change signal whereby said maximum secondary air temperature is maintained.

2. A control system as set forth in claim 1 in which said first means includes a draft meter for measuring the draft in the hood of said kiln, said meter producing a signal indicative of the magnitude of the draft measured, and a control system responsive to the said draft signal and to a signal indicative of the desired draft for controlling the flow of said exhausted part of the cooling air to tend to maintain the draft magnitude of its desired value.

3. A control system as set forth in claim 2 in which the said exhausted part of the cooling air is modified by positioning a flow controlling valve in an exhaust pipe connecting said cooler to a constant speed induced draft fan and connecting exhaust stack.

4. A control system as set forth in claim 1 in which said means includes means for determining the magnitude of a first control signal representing a proportional and a reset control response to said difference, means for modifying said first control signal in accordance with a lagged value of a signal representing the deviation between a desired and a measured kiln rotation speed to establish a second control signal representing the change required in a preset value for the rate of travel of said bed to maintain the desired maximum secondary air temperature, and means responsive to said second control signal, a signal representing said preset value for the rate of travel of said bed and a signal representing the measured rate of travel of said bed to establish a signal indicative of the change required in the rate of travel of said bed.

5. A method for controlling the clinker cooler of a rotary kiln to maximize the secondary air temperature while maintaining the desired kiln draft when part of the air filtered through the traveling clinker bed of the cooler is used as secondary air to support combustion of the fuel in the kiln and part is drawn through a cooler exhaust stack, comprising the steps of controlling the magnitude of that part of the cooling air drawn through the exhaust stack so as to tend to maintain said draft, producing a signal indicative of the change in rate of travel of said bed required to return the secondary air temperature to its desired maximum in response to the difference between a signal related to the magnitude of said exhausted part and a signal representing that value of said magnitude required to obtain said maximum secondary air temperature at a certain rate of travel for said clinker bed when said bed has a certain resistance to air flow, and modifying said rate of travel in response to said change signal to tend to maintain said maximum secondary air temperature.

6. A method as set forth in claim 5 in which the first step includes the steps of measuring the draft in the hood of said kiln and producing from said measurement a signal indicative of the magnitude of the draft, producing a control signal in response to the said draft signal and to a signal indicative of the desired draft, and controlling the flow of said exhausted part of the cooling air in response to said control signal to tend to maintain the draft magnitude at its desired value.

7. A method as set forth in claim 5 in which the second step includes determining the magnitude of a first control signal representing a proportional and a reset control response to said deviation, modifying said first control signal in accordance with a lagged value of a signal representing the deviation between a desired and a measured kiln rotation speed to establish a second control signal representing the change required in a preset value for the rate of travel of said bed to maintain the desired maximum secondary air temperature, and establishing said signal indicative of the change required in the rate of travel of said bed in response to said control signal, a signal representing said preset value for the rate of travel of said bed and a signal representing the measured rate of travel of said bed.

8. A process optimizing control system comprising means for providing two periodic signals having alternate symmetrical half waves of opposite polarity, said signals having a predetermined phase relationship depending upon the lags in the process, means applying of one said periodic signal to effect perturbation of a regulated variable of the process under control, means for producing a signal in response to the change in a measured variable of the process resulting from said perturbation, means for multiplying said last named signal by the other of said two signals to produce a product signal, means for averaging said product signal to produce a control signal, means for periodically sampling said control signal, said period being an integral multiple of the period of said other of said two signals, means for storing the sampled values for said control signal during the periods between sampling, and means for applying said sampled control signal to vary said regulated variable in sense and to extent to reduce the average of said product signal substantially to zero.

9. An optimizing control system as set forth in claim 8 which includes means for modifying said product signal by a preset bias signal whereby the optimum value of the variable under control is established at a point which is away from the point of slope inversion in that characteristic of the process relating the regulated variable being perturbed to the measured variable being optimized.

10. An optimizing control as set forth in claim 8 in which the half waves of said periodic signals are step functions of time.

11. An optimizing control system for the clinker cooler of a rotary kiln for maximizing the secondary air temperature while maintaining the desired hood draft when part of the air filtered through the traveling clinker bed of the cooler is used as secondary air for supporting combustion of the fuel in the kiln and part is drawn through a cooler exhaust stack comprising a first means for controlling the magnitude of that part of the cooling air drawn through the exhaust stack so as to tend to maintain said draft, a second means operable in response to the difference between a signal related to the magnitude of said exhausted part and a signal representing that value of said magnitude required to obtain said maximum secondary air temperature at a certain rate of travel for said clinker bed when said bed has a certain resistance to air flow for producing a signal indicative of the change in said rate of travel required to return said secondary air temperature to its desired maximum, a third means for providing two periodic signals having alternate symmetrical half waves of opposite polarity, said signals having a predetermined phase relationship depending upon the lag in the response of the secondary air temperature to changes in the rate of travel of said bed, a fourth means for applying one of said periodic signals to said second means to perturb the signal produced thereby, a fifth means for producing a signal representative of the measured value of said secondary air temperature, a sixth means for multiplying said secondary air temperature signal by the other of said periodic signals to produce a product signal, a seventh means for averaging said product signal to produce a control signal, an eighth means for periodically sampling said control signal, said period being an integral multiple of the period of said other of said two signals, a ninth means for storing the sampling values for said control signal during the periods between samples, a tenth means for applying said stored control signals to said second means to vary the signal produced thereby in sense an extent to reduce the average of said product signal substantially to zero, and an eleventh means responsive to the signal produced by said second means as modified by said fourth and said tenth means and operative to modify the rate of travel of said bed to tend to maintain said maximum secondary air temperature under varying conditions in said clinker cooler.

12. An optimizing control system as set forth in claim 11 in which said product signal is modified by a preset bias signal indicative of the slope of the curve of the process characteristic at which operation of the process is considered to be optimized.

13. An optimizing control system as set forth in claim 11 in which the half waves of said periodic signals are step functions of time.

14. A method for optimizing a process control system comprising the steps of providing two periodic signals having alternate symmetrical half waves of opposite polarity and a predetermined phase relationship depending upon the lags in the process, applying one of said periodic signals to effect perturbation of that regulated variable of the process under control, producing a signal in response to a change in a measured variable of the process resulting from said perturbation, multiplying said last named signal by the other of said two signals to produce a product signal, averaging said product signal to produce a control signal, periodically sampling said control signal at periods which are integral multiples of the period of said other of said two signals, storing the sampled values for said control signal during the period between said samplings and applying said sampled control signal to vary said regulated variable in sense and extent to reduce the average of said product signal substantially to zero.

15. The method of claim 14 in which said two periodic signals have half waves which are step functions of time.

16. The method of claim 14 which includes the step of modifying said product signal by a preset bias signal whereby the optimum value of the variable under control is established at a point which is away from the point of slope inversion in that characteristic of the process relating the variable being perturbed to the measured variable being optimized.

17. The method of optimizing the control of the clinker cooler of a rotary kiln so as to maximize the secondary air temperature of the kiln while maintaining the desired hood draft in the kiln when part of the air filtered through the traveling clinker bed of the cooler is used as secondary air in the kiln and part is drawn through a cooler exhaust stack comprising the steps of controlling the magnitude of that part of the air drawn through the exhaust stack so as to tend to maintain said draft at a desired value, producing a signal indicative of the change in the rate of travel required to return the secondary air temperature to its desired maximum value said signal being produced in response to the difference between, a signal related to the magnitude of said exhausted part and a signal representing that value of said magnitude required to obtain said maximum secondary air temperature at a certain rate of travel for said clinker bed when said bed has a certain resistance to air flow, providing two periodic signals having alternate symmetrical half waves of opposite polarity and a predetermined phase relationship depending upon the lag in the response of the secondary air temperature to changes in the rate of travel of said bed, perturbing said change signal in response to one of said periodic signals, producing a signal representative of the measured value of said secondary air temperature, multiplying said secondary air temperature signal by the other of said periodic signals to produce a product signal, averaging said product signal to produce a control signal, periodically sampling said control signal at periods which integral multiples of the period of said other of said two signals, storing the sampled values for said control signal during the periods between sampling, varying said change signal in response to said stored control signal in sense and extent to reduce the average of said product signal substantially to zero, and modifying the rate of travel of said bed in response to said change signal as modified so as to maintain said maximum secondary air temperature under varying conditions in said clinker cooler.

18. The method of claim 17 which includes the step of modifying said product signal by a preset bias signal indicative of the slope of the curve of the process characteristic at which operation of the process is considered to be optimized.

19. The method of claim 17 in which said half waves of said periodic signal are step functions of time.

20. A control system for controlling the clinker cooler of a rotary kiln to provide a predetermined maximum secondary air temperature while maintaining the desired hood draft when part of the air filtered through the traveling clinker bed of the cooler is used as secondary air in the kiln and part is drawn through a cooler exhaust stack, comprising a first means for controlling the magnitude of that part of the cooling air drawn through the exhaust stack so as to tend to maintain said draft, said means including valve means for varying the flow of air through said exhaust in accordance with its position, a second means operable in response to the position of said valve means and the desired value of said position required to obtain said maximum secondary air temperature at a certain rate of travel for said clinker bed when said bed has a certain resistance to air flow for producing a signal indicative of the change of said rate of travel required to return the secondary air temperature to its desired maximum, and a third means responsive to said change signal for modifying said rate of travel in accordance with said change signal whereby said maximum secondary air temperature is maintained.

References Cited

UNITED STATES PATENTS 3,208,741    9/1965    Wilhelm _____ 263—32

JOHN J. CAMBY, *Acting Primary Examiner.*

UNITED STATES PATENT OFFICE
CERTIFICATE OF CORRECTION

Patent No. 3,381,946

May 7, 1968

Charles W. Ross

It is hereby certified that error appears in the above numbered patent requiring correction and that the said Letters Patent should read as corrected below.

Column 2, line 10, "of of" should read -- of --. Column 3, line 56, "purpose" should read -- purposes --. Column 6, line 13, "polarity." should read -- polarity, --. Column 10, line 15, "is" should read -- in --; line 26, "rest" should read -- reset --; line 47, the equation should appear as shown below:

$$SDP_0 - SDP_a + \Delta SDP_0 + \delta SDP_0 = \Delta SDP$$

line 58, "by", first occurrence, should read -- as --. Column 13, line 37, "$\delta 'SDP_0$" should read -- $\delta SDP_0$ --. Column 14, line 72, after "said" insert -- second --. Column 18, line 14, after "which" insert -- are --.

Signed and sealed this 9th day of September 1969.

(SEAL)
Attest:

EDWARD M. FLETCHER, JR.
Attesting Officer

WILLIAM E. SCHUYLER, JR.
Commissioner of Patents